US010922630B2

(12) United States Patent  
Dong et al.

(10) Patent No.: US 10,922,630 B2  
(45) Date of Patent: Feb. 16, 2021

(54) QUEUING APPARATUS, AND QUEUING CONTROL METHOD THEREOF

(71) Applicant: BOE Technology Group Co., Ltd., Beijing (CN)

(72) Inventors: Wenchu Dong, Beijing (CN); Yu Gu, Beijing (CN); Hongbo Feng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 430 days.

(21) Appl. No.: 15/927,819

(22) Filed: Mar. 21, 2018

(65) Prior Publication Data

US 2019/0005415 A1 Jan. 3, 2019

(30) Foreign Application Priority Data

Jun. 28, 2017 (CN) .......................... 2017 1 0508475

(51) Int. Cl.
*G06Q 10/02* (2012.01)
*G06T 7/70* (2017.01)
*G06K 9/00* (2006.01)

(52) U.S. Cl.
CPC ......... *G06Q 10/02* (2013.01); *G06K 9/00664* (2013.01); *G06K 9/00711* (2013.01);
(Continued)

(58) Field of Classification Search
CPC ...... G06Q 10/02; G06T 7/70; G06K 9/00664; G06K 9/00013; G06K 9/00221
(Continued)

(56) References Cited

U.S. PATENT DOCUMENTS 6,839,081 B1 * 1/2005 Iijima ....................... G06T 7/20
348/46
2008/0059007 A1 * 3/2008 Whittaker ................ G08G 1/22
701/2

(Continued)

FOREIGN PATENT DOCUMENTS

| CN | 102642537 A | 8/2012 |
| CN | 105203107 A | 12/2015 |
| CN | 105488892 A | 4/2016 |

OTHER PUBLICATIONS

Yasushi Nakauchi and Reid Simmons, "A Social Robot that Stands in Line." 2002. Kluwer Academic Publishers, Autonomous Robots 12, pp. 313-324. https://link.springer.com/content/pdf/10.1023/A:1015273816637.pdf. (Year: 2002).*

(Continued)

*Primary Examiner* — John P Go
*Assistant Examiner* — Hunter A Molnar
(74) *Attorney, Agent, or Firm* — Arent Fox LLP; Michael Fainberg (57) ABSTRACT

The disclosure discloses a queuing apparatus and a queuing control method thereof. The queuing apparatus includes: a distance sensor configured to determine a position of a front queuer, a distance between the queuing apparatus and the front queuer; a queuing information processor configured to determine a movement instruction for driving the queuing apparatus to move in some direction, according to the distance; a drive circuit board configured to drive the queuing apparatus according to the movement instruction to move accordingly; a user identity recognition device configured to input information about a current user before the queuing apparatus starts queuing, and to input the information about the current user again to make the queuing apparatus stop queuing; and a display screen configured to display the information about the current user to a window (Continued)

when the queuing window moves to the window, and before the information about the current user is released.

7 Claims, 4 Drawing Sheets

(52) U.S. Cl.
CPC ............ *G06T 7/70* (2017.01); *G06K 9/00013* (2013.01); *G06K 9/00221* (2013.01)

(58) Field of Classification Search
USPC .............................................................. 705/5
See application file for complete search history.

(56) References Cited

U.S. PATENT DOCUMENTS

| | | | | |
|---|---|---|---|---|
| 2011/0201978 | A1* | 8/2011 | Jeon | A61G 5/128 601/35 |
| 2012/0158580 | A1* | 6/2012 | Eram | G06Q 20/10 705/39 |
| 2013/0117867 | A1* | 5/2013 | Fung | G06F 21/88 726/35 |
| 2015/0166062 | A1* | 6/2015 | Johnson | B60W 30/12 701/41 |
| 2015/0356648 | A1* | 12/2015 | Baryakar | G06O 30/0617 705/26.1 |
| 2016/0345176 | A1* | 11/2016 | DeWitt | H04W 4/12 |
| 2018/0210451 | A1* | 7/2018 | Naik | B60W 30/09 |

OTHER PUBLICATIONS

"New Zealand intellifent robots line up to buy iPhone 7 instead of the owner, made in Shenzhen." Sep. 20, 2016. Tencent Technology. https://tech.qq.com/a/20160920/021237.htm. (Year: 2016).*

Robert Collins, "Lecture 12: Camera Projection." Sep. 22, 2015. Penn State, CSE486. https://web.archive.org/web/20150922072346/http://www.cse.psu.edu/~rtc12/CSE486/lecture12.pdf. (Year: 2015).*

Simon Liao and Miroslaw Park. "On the Accuracy of Zernike Moments for Image Analysis." Dec. 1998. IEEE Transactions on Pattern Analysis and Machine Intelligence, vol. 20, No. 12. p. 1358. (Year: 1998).*

Baral, S. 100 apple customers use robots to wait in line for them. (Sep. 17, 2016). International Business Times—US Ed. Retrieved from https://dialog.proquest.com/professional/docview/1975505434?accountid=161862. (Year: 2016).*

Office Action for corresponding Chinese Application 201710508475.5 dated May 24, 2019.

The Japanese designed a lazy cancer artifact. Sit down and move by yourself, https://baijiahao.baidu.com/s?id=15640992390 48255&wfr=spider&for=pc, Apr. 8, 2017.

New Zealand intelligent robots instead of the director lined up to buy iPhone7, http://tech.qq.com/a/0160920/021237.htm, Sep. 20, 2017.

* cited by examiner

QUEUING APPARATUS, AND QUEUING CONTROL METHOD THEREOF

CROSS-REFERENCE TO RELATED APPLICATION

This Application claims priority to Chinese Patent Application No. 201710508475.5, filed on Jun. 28, 2017, the content of which is incorporated by reference in the entirety.

FIELD

The present disclosure relates to the field of intelligent queuing, and particularly to a queuing apparatus, and a queuing control method thereof.

BACKGROUND

Although online reservation, automatic number calling, and other service items have been available at present in banks, hospitals, and other places, there remains the following problems: 1. there are still a large number of manual queuing scenarios, e.g., queuing for an additional number of patients in a hospital, queuing for purchase, etc.; and 2. the window number calling function provides only number calling, and is less comfort, convenient for users, and is less intelligent and automatic.

SUMMARY

The disclosure provides a queuing apparatus, and a queuing control method thereof.

In one aspect, an embodiment of the disclosure provides a queuing apparatus including: a distance sensor configured to determine a position of a front queuer, and a distance between the queuing apparatus and the front queuer; a queuing information processor configured to determine a movement instruction for driving the queuing apparatus to move in some direction, according to the distance between the queuing apparatus and the front queuer; a drive circuit board configured to drive the queuing apparatus according to the movement instruction to move accordingly; a user identity recognition device configured to input information about a current user before the queuing apparatus starts queuing, so that the queuing apparatus starts a queuing mode, and to input the information about the current user again, so that the queuing apparatus stops queuing and releases the information about the current user; and a display screen configured to display the information about the current user to a window upon determining that the queuing apparatus moves to the window, and before the user identity recognition device releases the information about the current user.

In another aspect, an embodiment of the disclosure further provides a queuing control method for the queuing apparatus above according to the embodiment of the disclosure, the method including: inputting the information about the current user, so that the queuing apparatus starts the queuing mode; determining the position of the front queuer, and the distance between the queuing apparatus and the front queuer; determining the movement instruction for driving the queuing apparatus to move in some direction, according to the distance; driving the queuing apparatus according to the movement instruction to move accordingly; displaying the information about the current user to the window upon determining that the queuing apparatus moves to the window; and inputting the information about the current user again, so that the queuing apparatus stops queuing and releases the information about the current user.

BRIEF DESCRIPTION OF THE DRAWINGS

In order to make the technical solutions according to the embodiments of the present disclosure more apparent, the drawings to which a description of the embodiments refers will be briefly introduced below, and apparently the drawings to be described below are merely illustrative of some of the embodiments of the present disclosure, and those ordinarily skilled in the art can derive from these drawings other drawings without any inventive effort.

DETAILED DESCRIPTION OF THE EMBODIMENTS

In order to make the objects, features, and advantages above of the disclosure more apparent, the disclosure will be described below in further details with reference to the drawings and the embodiments thereof. However, the exemplary embodiments can be embodied in a variety of forms, and shall not be interpreted as being limited to those described here; and on the contrary, these embodiments are provided to make the disclosure more comprehensive and complete, and to convey their idea fully to those skilled in the art. Like reference numerals in the drawings represent like or similar components, so a repeated description thereof will be omitted. All the terms described in the context to represent positions and directions are presented with reference to the drawings, but may be altered as needed without departing from the scope of the disclosure as claimed. The drawings of the disclosure are merely intended to illustrate relative positional relationships, and some component may be exaggerated as illustrated for the sake of convenient understanding.

It shall be noted that specific details will be set forth in the following description to facilitate full understanding of the disclosure, but the disclosure can be embodied in a variety of other embodiments than those described here, and those skilled in the art can generalize them similarly without departing from the spirit of the disclosure, so the disclosure will not be limited to the particular embodiments as disclosed below. Some denomination as used in the description and the claims refers to a specific component. Those skilled in the art shall appreciate that the same component may be denominated by different hardware manufacturers using different names. One component will be distinguished from another component in the description and the claims by their functional difference instead of their different names. The opening term "include" or "comprise" as referred to throughout the description and the claims shall be interpreted as "include but will not be limited to". Preferred embodiments of the disclosure will be described below in the description, but they are merely intended to illustrate a general principle of the disclosure instead of limiting the scope of the disclosure thereto. The scope of the disclosure as claimed shall be as defined in the appended claims.

The embodiments of the disclosure provide a queuing apparatus, and a queuing control method thereof so as to take the place of manual queuing to improve the comfort of users.

Implementations of the queuing apparatus and the queuing control method thereof according to the embodiments of the disclosure will be described below in details.

Figure 1:
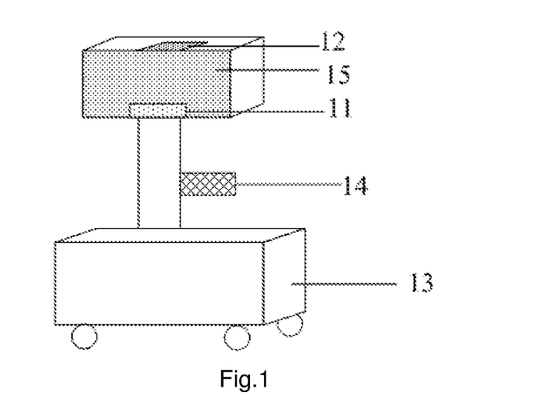
FIG. 1 is a first schematic structural diagram of a queuing apparatus according to an embodiment of the disclosure.

As illustrated in FIG. 1, the embodiments of the disclosure provide a queuing apparatus including following components.

A distance sensor 11, configured to determine a position of a front queuer, and a distance between the queuing apparatus and the front queuer.

In some embodiments, the front queuer in the embodiments of the disclosure is a person or a robot queuing right in the front of the queuing apparatus after the queuing apparatus starts a queuing mode. Where while the queuing apparatus is queuing, the front queuer may be the same object all the time, or the front queuer may not be the same object all the time if there is someone jumping or quitting the queue.

A queuing information processor 12, configured to determine a movement instruction for driving the queuing apparatus to move in some direction, according to the distance between the queuing apparatus and the front queuer.

In some embodiments, the movement instruction can be move forward, turn around, move backward, etc.

A drive circuit board 13, configured to drive the queuing apparatus according to the movement instruction to move accordingly.

For example, after the front queuer moves forward, in order to maintain a preset distance between the queuing apparatus and the front queuer all the time, the drive circuit board drives the queuing apparatus to move forward, etc., according to the movement instruction transmitted by the queuing information processor.

A user identity recognition device 14, configured to input information about a current user before the queuing apparatus starts queuing, so that the queuing apparatus starts a queuing mode, and to input the information about the current user again, so that the queuing apparatus stops queuing and releases the information about the current user.

In some embodiments, in the embodiments of the disclosure, the information about the current user includes at least a name of the current user, a selected service, and a service code, and the information about the current user can be input through entering a fingerprint or recognizing a face. Where the user identity recognition device in the embodiments of the disclosure is configured to input the information about the user to start the queuing mode, and to enter the information about the same user again to stop the queuing mode, and the information about the user can be input, or input again through inputting a fingerprint or recognizing a face, although the embodiments of the disclosure will not be limited thereto. Of course, if there is some user quitting the queue, then if no duplicate fingerprint or face information has been entered in a preset length of time, then the queuing apparatus will stop queuing, and be restarted.

A display screen 15, configured to display the information about the current user to a window upon determining that the queuing apparatus moves to the window, and before the user identity recognition device releases the information about the current user.

In some embodiments, the display screen in the embodiments of the disclosure is primarily configured to display the information about the current user, and in order to guarantee the secrecy of the information about the current user, the information about the current user can be displayed to a human operator at the window only upon determining that the queuing apparatus moves to the window, and upon determining that the information about the current user is the user controlling the queuing apparatus. Of course, for the sake of convenience, alternatively the information about the current user can be displayed intermittently or all the time while the queuing apparatus is queuing, and the embodiments of the disclosure will not be limited to any particular length of time for which the information about the current user is displayed, where the information about the current user includes at least the name of the current user, the selected service, and the service code.

The queuing apparatus according to the embodiments of the disclosure can take place of manual queuing in a queuing scenario. The queuing apparatus includes: a distance sensor configured to determine a position of a front queuer, and a distance between the queuing apparatus and the front queuer; a queuing information processor configured to determine a movement instruction for driving the queuing apparatus to move in some direction, according to the distance between the queuing apparatus and the front queuer; a drive circuit board configured to drive the queuing apparatus according to the movement instruction to move accordingly; a display screen configured to display information about a current user to a window upon determining that the queuing apparatus moves to the window; and a user identity recognition device configured to input the information about the current user before the queuing apparatus starts queuing, so that the queuing apparatus starts a queuing mode, and to input the information about the current user again, so that the queuing apparatus stops queuing and releases the information about the current user. Accordingly the queuing apparatus according to the embodiments of the disclosure senses the distance between the queuing apparatus and the front queuer through the distance sensor, and moves forward, etc., under the control of the drive circuit board according to the movement instruction transmitted by the queuing information processor; and when the queuing apparatus moves to the window, the information about the current user is displayed to the window in a timely manner, and the information about the current user is input again, so that the queuing apparatus stops the current queuing task and releases the information about the current user. Apparently the queuing apparatus according to the embodiments of the disclosure can take place of manual queuing to thereby improve the comfort of the user.

Figure 2A:
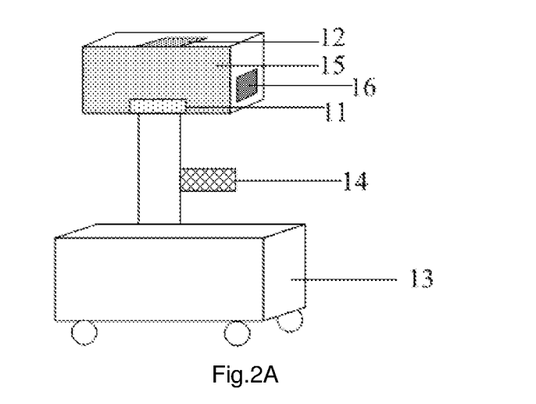
FIG. 2A is a second schematic structural diagram of a queuing apparatus according to an embodiment of the disclosure.

In some embodiments, the front queuer may move leftward or rightward so that the front queuer may not appear right in front of the queuing apparatus, and in order to enable the queuing apparatus to stay on a straight line with the front queuer, the queuing apparatus can follow immediately, so the angle between the front queuer and the queuing apparatus needs to be recognized so that the queuing apparatus can turn around. As illustrated in FIG. 2A, the queuing apparatus above according to the embodiments of the disclosure further includes a front object recognition device 16 configured to recognize the front queuer, and to determine an angle of the front queuer relative to the queuing apparatus.

Figure 2B:
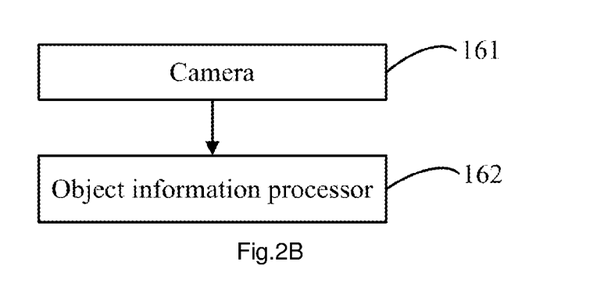
FIG. 2B is a schematic structural diagram of a front object recognition device according to an embodiment of the disclosure.

In some embodiments, in the queuing apparatus above according to the embodiments of the disclosure, as illustrated in FIG. 2B, the front object recognition device 16 includes: a camera 161 configured to acquire an image of the front queuer of the queuing apparatus, and to determine a characteristic of the front queuer; an object information processor 162 configured to determine a position of the front queuer in the image according to the characteristic of the front queuer, to track the position of the front queuer in the image in real time, and to calculate the angle of the front queuer relative to the queuing apparatus according to the position of the front queuer in the image.

In some embodiments, the camera acquires the image in front of the queuing apparatus, extracts the characteristic from the acquired image, e.g., a color, an aspect ratio, a texture, and other information, and then transmits the information to the object information processor. The object information processor is configured to detect the acquired image for an object, for example, human body samples or robot samples are trained using a support vector or another machine learning algorithm, or deep learning algorithm to create an object detection model, and then the extracted characteristic information is input to the object detection model to thereby detect the acquired image for an object in the image, where the queuer located right in front of the queuing apparatus is an object in the embodiments of the disclosure. Accordingly after the object information processor detects the image for an object, there may be a plurality of objects, and at this time, only the object positioned at the center of the image is determined as the desired object, where the desired object is the queuer located right in front of the queuing apparatus. Since there is the largest area of pixels in the image, which are occupied by the queuer located right in front of the queuing apparatus, the object can be determined accordingly. After the object, i.e. the front queuer is determined; the object information processor is further configured to track the object in real time through characteristic extraction. Where the object can be tracked, and coordinates of the position of the object in the image can be determined, in real time in the Camshift, Kalman, TLD, particle filter, and other tracking algorithms, and for example, u, v are the abscissa and the ordinate respectively of the object in the image. After that, the object information processor is further configured to calculate the angle of the front queuer relative to the queuing apparatus according to the coordinates of the front queuer in the image.

In some embodiments, in the queuing apparatus above according to the embodiments of the disclosure, the object information processor is configured to determine the angle of the front queuer relative to the queuing apparatus in an equation of $$\theta = \arctan\frac{X_C}{Y_C}. \quad (1)$$

Where $$v = f_v * \frac{Y_C}{Z_C} + v_o, u = f_u * \frac{X_C}{Z_C} + u_o,$$

where $(u_o, v_o)$ are coordinates of a central point of the image of the front queuer acquired by the camera, and $f_u$, $f_v$ are lengths of focuses respectively of the camera in horizontal and vertical directions; and (u, v) are coordinates of the front queuer in the image acquired by the camera.

In some embodiments, $(u_o, v_o)$, $f_u$ and $f_v$ can be obtained respectively through calibration after the camera acquires the image, and since the calibration technology is well known in the art, a repeated description thereof will be omitted here. Generally the distance sensor and the camera are located in the vertical direction of the queuing apparatus, so the angle of the object (i.e. the front queuer) relative to the camera is the angle of the object relative to the distance sensor, and since the distance sensor determines the distance between the front queuer and the queuing apparatus, the object information processor can determine the angle of the front queuer relative to the queuing apparatus, so that the particular position including the angle and the distance of the front queuer relative to the queuing apparatus can be determined precisely.

In some embodiments, in the queuing apparatus above according to the embodiments of the disclosure, the queuing information processor is further configured to transmit the movement instruction for driving the queuing apparatus in some direction, to the drive circuit board according to the angle of the front queuer relative to the queuing apparatus calculated by the object information processor, and the distance between the queuing apparatus and the front queuer determined by the distance sensor.

Figure 3:
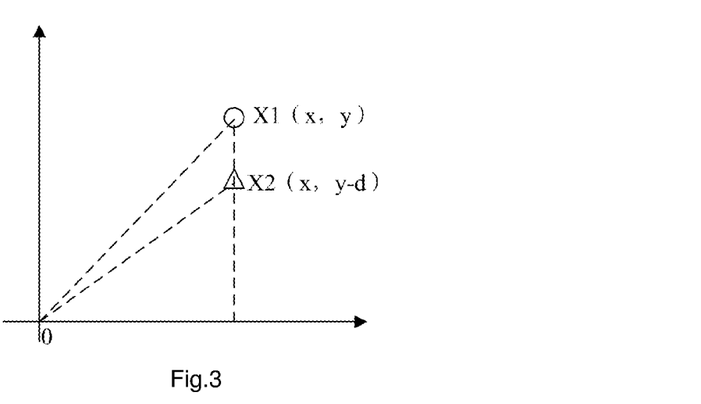
FIG. 3 is a schematic diagram of coordinates according to an embodiment of the disclosure.

For example, the distance sensor determines the distance between the queuing apparatus and the front queuer as ρ, and the object information processor determines the angle between the front queuer and the queuing apparatus as θ; and as illustrated in FIG. 3, the position of the current front queuer is X1 (x, y), and there is a preset distance d between the queuing apparatus and the front queuer, so it is determined that the queuing apparatus needs to move to the position X2 (x, y−d), where the queuing apparatus is currently located at the position of the origin, where:

$$x = \rho \sin \theta$$

$$y = \rho \cos \theta \quad (2).$$

Accordingly in order to enable the queuing apparatus to move from the position of the origin to the position of X2, the queuing apparatus needs to be rotated by the angle of $$\arctan\frac{x}{y-d},$$

and then move forward over the distance of $\sqrt{x^2+(y-d)^2}$.

Figure 4:
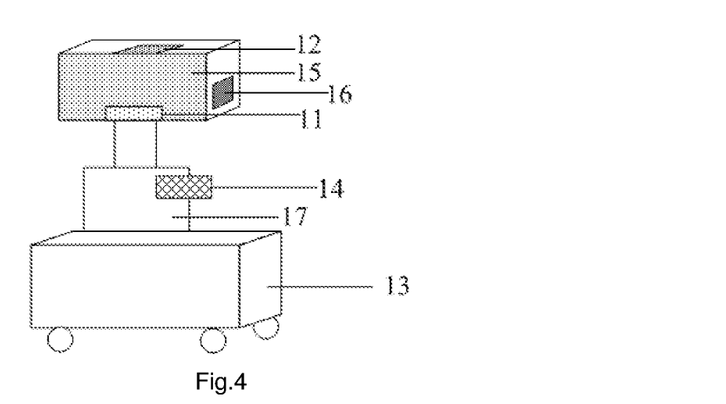
FIG. 4 is a third schematic structural diagram of a queuing apparatus according to an embodiment of the disclosure.

In some embodiments, in the queuing apparatus above according to the embodiments of the disclosure, as illustrated in FIG. 4, the queuing apparatus further includes a foldable chair 17 configured to provide the current user with a seat, and to be folded when it is not used. In some embodiments, the foldable chair provides the user with a place to put his or her thing, or provides the user with a seat as needed, and the foldable chair is folded as needed for the user to thereby save a space. Further, the shape of the foldable chair will not be limited to any shape.

Figure 5:
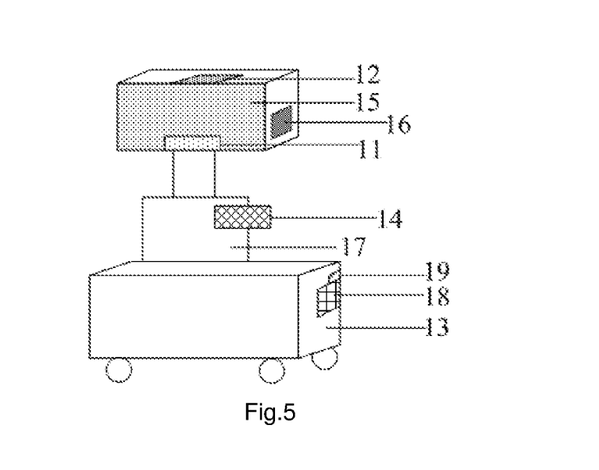
FIG. 5 is a fourth schematic structural diagram of a queuing apparatus according to an embodiment of the disclosure.

In some embodiments, in the queuing apparatus above according to the embodiments of the disclosure, as illustrated in FIG. 5, the queuing apparatus further includes: a non-instructed movement detection device 18 configured to transmit an alarm instruction to an alarm when the queuing apparatus is driven to move by other device than the drive circuit board; and the alarm 19 is configured to give a warning upon reception of the alarm instruction. In some embodiments, the non-instructed movement detection device can detect using a gravity sensor or another sensor whether the queuing apparatus is moving while being carried manually, or moving freely in the queuing process. Upon determining that the queuing apparatus is moving or shocked due to a manual force, the non-instructed movement detection device determines that the queuing apparatus is driven by other device than the drive circuit board to move, and transmits the alarm instruction to the alarm.

It shall be noted that the positions of the respective components in FIG. 1, FIG. 2A, FIG. 4, and FIG. 5 in the embodiments of the disclosure are only illustrative, but their positions in the queuing apparatus will not be limited thereto, where the positions of the distance sensor 11, the queuing information processor 12, the drive circuit board 13, the user identity recognition device 14, the display screen 15, the front object recognition device 16, the foldable chair 17, the non-instructed movement detection device 18, and the alarm 19 will not be limited to those illustrated in the figures, but may alternatively be arranged otherwise as needed, although the embodiments of the disclosure will not be limited thereto.

Based upon the same inventive concept, the embodiments of the disclosure further provide a robot including the queuing apparatus according to any one of the embodiments of the disclosure.

Figure 6:
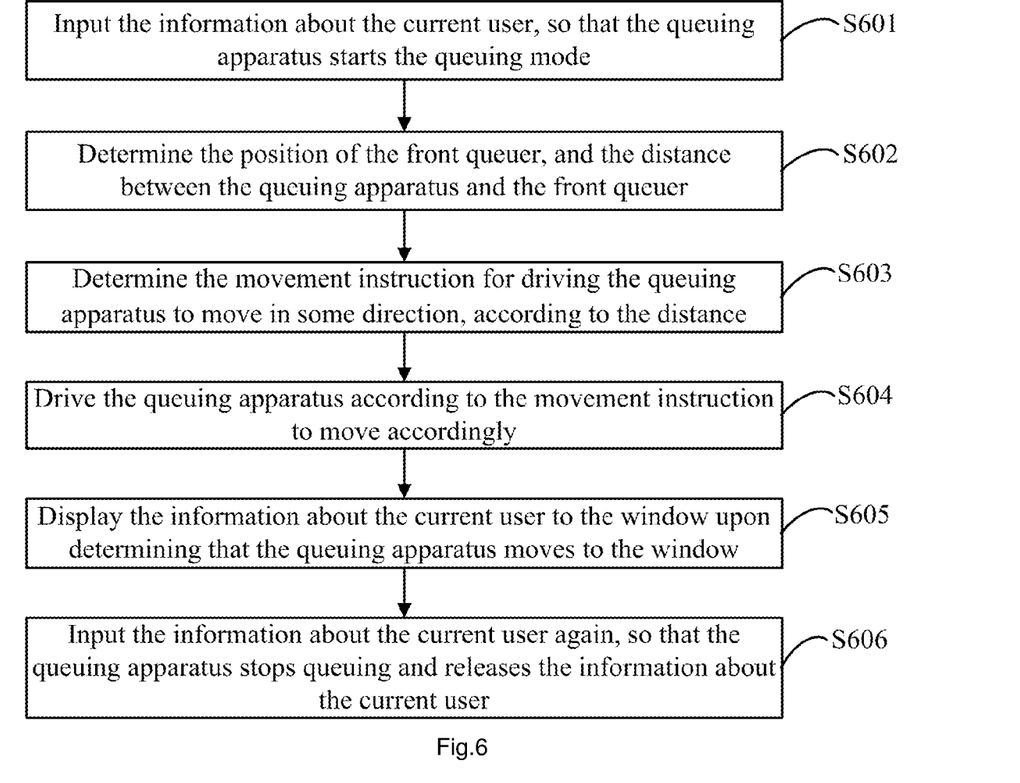
FIG. 6 is a first schematic flow chart of a queuing control method for a queuing apparatus according to an embodiment of the disclosure.

Based upon the same inventive concept, as illustrated in FIG. 6, the embodiments of the disclosure further provide a queuing control method for the queuing apparatus according to any one of the embodiments of the disclosure, where the method includes the following operations.

S601 is to input the information about the current user, so that the queuing apparatus starts the queuing mode.

S602 is to determine the position of the front queuer, and the distance between the queuing apparatus and the front queuer.

S603 is to determine the movement instruction for driving the queuing apparatus to move in some direction, according to the distance.

S604 is to drive the queuing apparatus according to the movement instruction to move accordingly.

S605 is to display the information about the current user to the window upon determining that the queuing apparatus moves to the window.

S606 is to input the information about the current user again, so that the queuing apparatus stops queuing and releases the information about the current user.

Here the displayed information about the current user includes at least the name of the current user, a selected service, and a service code. The information about the current user can be input through entering a fingerprint or recognizing a face to start the queuing apparatus, and the same fingerprint information or face information can be input to stop the queuing mode of the queuing apparatus, although the embodiments of the disclosure will not be limited thereto.

In the queuing control method for the queuing apparatus above according to the embodiments of the disclosure, firstly the position of the front queuer is obtained, and the distance between the queuing apparatus and the front queuer is determined; then the movement instruction for driving the queuing apparatus to move in some direction is transmitted according to the distance, so that the queuing apparatus moves according to the instruction; and when the queuing apparatus moves to the window, the information about the current user is displayed to a human operator, and when the information about the current user is input again, the queuing apparatus stops queuing and releases the information about the current user. Accordingly the queuing apparatus according to the embodiments of the disclosure senses the distance between the queuing apparatus and the front queuer, and moves forward, etc., under the control of a movement instruction; and when the queuing apparatus moves to the window, the information about the current user is displayed to the window in a timely manner, and the information about the current user is input again in a timely manner, so that the queuing apparatus stops the queuing task. Apparently the queuing apparatus according to the embodiments of the disclosure can take place of manual queuing to thereby improve the comfort of the user.

In some embodiments, the front queuer may move leftward or rightward so that the front queuer may not appear right in front of the queuing apparatus, and in order to enable the queuing apparatus to stay on a straight line with the front queuer, the queuing apparatus can follow immediately, so the angle between the front queuer and the queuing apparatus needs to be recognized so that the queuing apparatus can turn around. In the queuing control method for the queuing apparatus above according to the embodiments of the disclosure, after the queuing apparatus starts a queuing mode, and before the position of the front queuer is determined, the method further includes: acquiring an image of the front queuer of the queuing apparatus, and determining a characteristic of the front queuer; determining a position of the front queuer in the image according to the characteristic of the front queuer; tracking the position of the front queuer in the image in real time; and calculating an angle of the front queuer relative to the queuing apparatus according to the position of the front queuer in the image.

In some embodiments, since when the front queuer is replaced, e.g., someone jumping or quitting the queue, the characteristic information of the front queuer will be changed, in the queuing control method for the queuing apparatus above according to the embodiments of the disclosure, after the queuing apparatus is driven according to the moment instruction to move accordingly, and before the queuing apparatus moves to the window, the method further includes: determining whether there is someone jumping a queue between the queuing apparatus and the front queuer, or whether the front queuer quits the queue, and if so, then acquiring an image of a new front queuer of the queuing apparatus, and determining a characteristic of the new front queuer; otherwise, determining whether the queuing apparatus moves to the window.

In some embodiments, in order to further enable the user to be served normally, in the queuing control method for the queuing apparatus above according to the embodiments of the disclosure, upon determining that the queuing apparatus moves to the window, the method further includes: informing the current user to come to the window. In some embodiments, the queuing apparatus transmits prompt information to the user, and for example, the queuing apparatus transmits the prompt information to a mobile phone of the user, or announces the name of the user to ask the user to come to the window for being served, or the queuing apparatus can transmit the image acquired by the camera to the mobile phone of the user to ask the user to come to the window for being served.

In some embodiments, in order to stop the queuing mode of the queuing apparatus after the user comes to the window for being served, in the queuing control method for the queuing apparatus above according to the embodiments of the disclosure, the user can initially input his or her general information through entering a fingerprint or otherwise so that the queuing apparatus starts a queuing mode, although the embodiments of the disclosure will not be limited thereto. When the queuing apparatus arrives at the window, and the user is asked to come to the window, the user can input the fingerprint information or face recognition information again so that the queuing mode is stopped.

The queuing control method for the queuing apparatus according to the embodiments of the disclosure will be described below in details in connection with an embodiment thereof.

Figure 7:
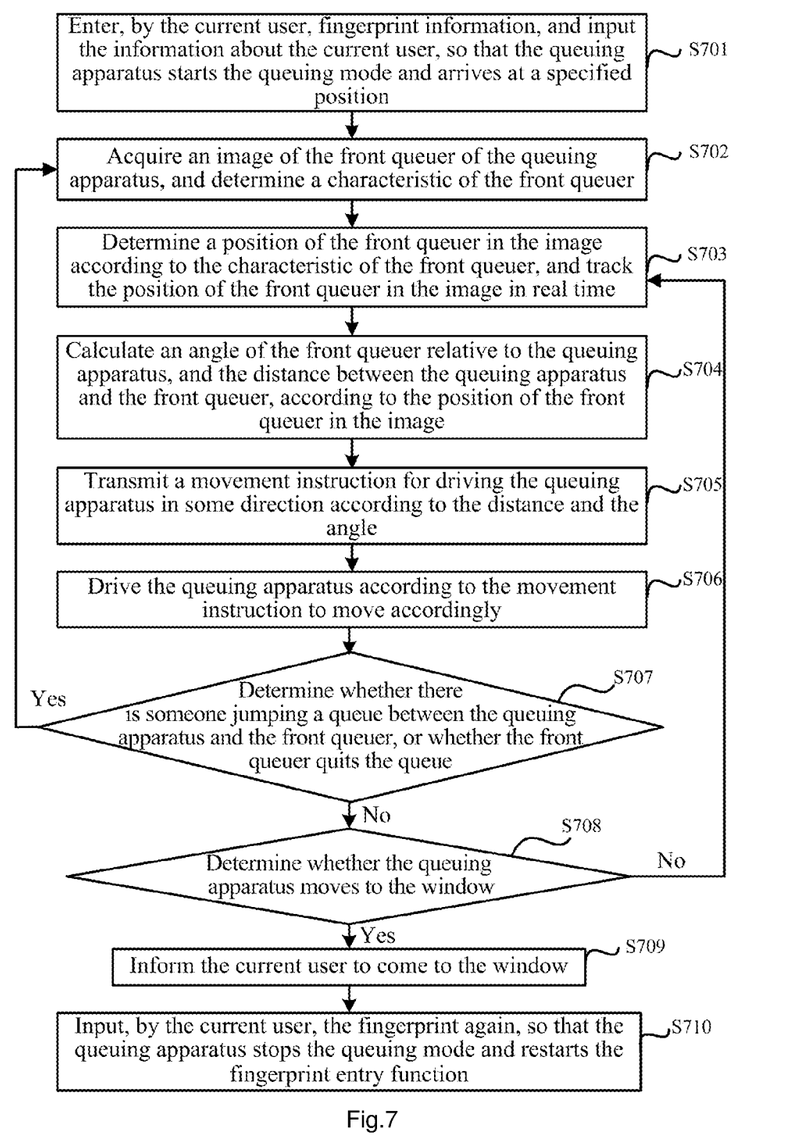
FIG. 7 is a second schematic flow chart of a queuing control method for a queuing apparatus according to an embodiment of the disclosure.

As illustrated in FIG. 7, the queuing control method for the queuing apparatus according to the embodiments of the disclosure includes the following operations.

S701 is to enter, by the current user, fingerprint information, and to input the information about the current user, so that the queuing apparatus starts the queuing mode and arrives at a specified position.

Here in order to avoid another user from accessing the queuing apparatus, and thus the information about the current user from being confused, a fingerprint entry function is disabled after the queuing apparatus starts the queuing mode.

S702 is to acquire an image of the front queuer of the queuing apparatus, and to determine a characteristic of the front queuer.

S703 is to determine a position of the front queuer in the image according to the characteristic of the front queuer, and to track the position of the front queuer in the image in real time.

S704 is to calculate an angle of the front queuer relative to the queuing apparatus, and the distance between the queuing apparatus and the front queuer, according to the position of the front queuer in the image.

S705 is to transmit a movement instruction for driving the queuing apparatus in some direction according to the distance and the angle.

S706 is to drive the queuing apparatus according to the movement instruction to move accordingly.

S707 is to determine whether there is someone jumping a queue between the queuing apparatus and the front queuer, or whether the front queuer quits the queue, and if so, to proceed to the operation S702; otherwise, to proceed to the operation S708.

Where determining whether there is someone jumping or quitting the queue includes: when the characteristic of the front queuer disappears for a period of time T1, and a characteristic of a new front queuer is detected in a period of time T2, while the queuing apparatus is tracking in real time, determining that there is someone jumping or quitting the queue in front of the queuing apparatus. And in this case, the queuing apparatus will tracks the new front queuer, where the length of time of T2 is greater than that of T1.

S708 is to determine whether the queuing apparatus moves to the window, and if so, to proceed to the operation S709; otherwise, to proceed to the operation S703.

Here it is determined whether the queuing apparatus moves to the window, in such a way that when no characteristic of a human body or another queuing apparatus has been detected in a central area of the image acquired by the camera of the queuing apparatus for a preset length of time, it is determined that the queuing apparatus arrives at the window, where the preset length of time can be preset, and can be varied as needed in a real application, although the embodiments of the disclosure will not be limited thereto.

S709 is to inform the current user to come to the window.

S7010 is to input, by the current user, the fingerprint again, so that the queuing apparatus stops the queuing mode and restarts the fingerprint entry function.

In summary, the queuing apparatus according to the embodiments of the disclosure can take place of manual queuing in a queuing scenario. The queuing apparatus includes: a distance sensor configured to determine a position of a front queuer, and a distance between the queuing apparatus and the front queuer; a queuing information processor configured to determine a movement instruction for driving the queuing apparatus to move in some direction, according to the distance between the queuing apparatus and the front queuer; a drive circuit board configured to drive the queuing apparatus according to the movement instruction to move accordingly; a display screen configured to display information about a current user to a window upon determining that the queuing window moves to the window; and a user identity recognition device configured to input the information about the current user before the queuing apparatus starts queuing, so that the queuing apparatus starts a queuing mode, and to input the information about the current user again, so that the queuing apparatus stops queuing and releases the information about the current user. Accordingly the queuing apparatus according to the embodiments of the disclosure senses the distance between the queuing apparatus and the front queuer through the distance sensing unit, and moves forward, etc., under the control of the drive circuit board according to the movement instruction transmitted by the queuing information processor; and when the queuing apparatus moves to the window, the information about the current user is displayed to the window in a timely manner, and the information about the current user is input again, so that the queuing apparatus stops the current queuing task and releases the information about the current user. Apparently the queuing apparatus according to the embodiments of the disclosure can take place of manual queuing to thereby improve the comfort of the user.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A queuing apparatus, comprising:
   a distance sensor configured to determine a position of a front queuer, and a distance between the queuing apparatus and the front queuer;
   a queuing information processor configured to determine a movement instruction for driving the queuing apparatus to move in some direction, according to the distance between the queuing apparatus and the front queuer;
   a drive circuit board configured to drive the queuing apparatus according to the movement instruction to move accordingly;
   a user identity recognition device configured to input information about a current user before the queuing apparatus starts queuing, so that the queuing apparatus starts a queuing mode, and to input the information about the current user again, so that the queuing apparatus stops queuing and releases the information about the current user;

a display screen configured to display the information about the current user so that the information about the current user is shown to a window for serving a user upon determining that the queuing apparatus moves to the window, and before the user identity recognition device releases the information about the current user; and a front object recognition device configured to recognize the front queuer, and to determine an angle of the front queuer relative to the queuing apparatus;

wherein the front object recognition device comprises:

a camera configured to acquire an image of the front queuer of the queuing apparatus, and to determine a characteristic of the front queuer; and an object information processor configured to determine a position of the front queuer in the image according to the characteristic of the front queuer; to track the position of the front queuer in the image in real time; and to calculate the angle of the front queuer relative to the queuing apparatus according to the position of the front queuer in the image;

wherein the object information processor is configured:

to determine the angle of the front queuer relative to the queuing apparatus in an equation of:

$$\theta = \arctan \frac{X_C}{Y_C};$$

wherein $$v = f_v * \frac{Y_C}{Z_C} + v_o, \text{ and } u = f_u * \frac{X_C}{Z_C} + u_o;$$

wherein $(u_o, v_o)$ are coordinates of a central point of the image of the front queuer acquired by the camera, and $f_u$, $f_v$ are lengths of focuses respectively of the camera in horizontal and vertical directions; and $(u, v)$ are coordinates of the front queuer in the image acquired by the camera.

2. The queuing apparatus according to claim 1, wherein the queuing information processor is further configured:

to transmit the movement instruction for driving the queuing apparatus in some direction, to the drive circuit board according to the angle of the front queuer relative to the queuing apparatus calculated by the object information processor, and the distance between the queuing apparatus and the front queuer determined by the distance sensor.

3. The queuing apparatus according to claim 1, wherein the queuing apparatus further comprises:

a foldable chair configured to provide the current user with a seat, and to be folded when it is not used.

4. The queuing apparatus according to claim 1, wherein the queuing apparatus further comprises:

a non-instructed movement detection device configured to transmit an alarm instruction to an alarm when the queuing apparatus is driven by other device than the drive circuit board to move; and the alarm configured to give a warning upon reception of the alarm instruction.

5. A queuing control method for a queuing apparatus, the method comprising:

inputting the information about the current user, so that the queuing apparatus starts the queuing mode;

acquiring an image of the front queuer of the queuing apparatus, and determining a characteristic of the front queuer;

determining a position of the front queuer in the image according to the characteristic of the front queuer, and tracking the position of the front queuer in the image in real time; and calculating an angle of the front queuer relative to the queuing apparatus according to the position of the front queuer in the image;

determining the position of the front queuer, and the distance between the queuing apparatus and the front queuer;

determining the movement instruction for driving the queuing apparatus to move in some direction, according to the distance;

driving the queuing apparatus according to the movement instruction to move accordingly;

displaying the information about the current user to the window upon determining that the queuing apparatus moves to the window; and inputting the information about the current user again, so that the queuing apparatus stops queuing and releases the information about the current user;

wherein the angle of the front queuer relative to the queuing apparatus is determined in an equation of:

$$\theta = \arctan \frac{X_C}{Y_C};$$

wherein $$v = f_v * \frac{Y_C}{Z_C} + v_o, \text{ and } u = f_u * \frac{X_C}{Z_C} + u_o;$$

wherein $(u_o, v_o)$ are coordinates of a central point of the image of the front queuer acquired by the camera, and $f_u$, $f_v$ are lengths of focuses respectively of the camera in horizontal and vertical directions; and $(u, v)$ are coordinates of the front queuer in the image acquired by the camera.

6. The queuing controlling method according to claim 5, wherein after the queuing apparatus is driven according to the moment instruction to move accordingly, and before the queuing apparatus moves to the window, the method further comprises:

determining whether there is someone jumping a queue between the queuing apparatus and the front queuer, or whether the front queuer quits the queue, and if so, then acquiring an image of a new front queuer of the queuing apparatus, and determining a characteristic of the new front queuer; otherwise, determining whether the queuing apparatus moves to the window.

7. The queuing controlling method according to claim 6, wherein upon determining that the queuing apparatus moves to the window, the method further comprises:

informing the current user to come to the window.

* * * * *